US011875798B2

(12) United States Patent
Cunico et al.

(10) Patent No.: US 11,875,798 B2
(45) Date of Patent: Jan. 16, 2024

(54) PROFILES FOR ENHANCED SPEECH RECOGNITION TRAINING

(71) Applicant: International Business Machines Corporation, Armonk, NY (US)

(72) Inventors: Hernan A. Cunico, Holly Springs, NC (US); Zachary George Shearin, Durham, NC (US); David Whaley, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 247 days.

(21) Appl. No.: 17/246,988

(22) Filed: May 3, 2021

(65) Prior Publication Data

US 2022/0351732 A1 Nov. 3, 2022

(51) Int. Cl.
*G10L 15/32* (2013.01)
*G10L 15/04* (2013.01)
*G10L 15/26* (2006.01)
*G10L 15/30* (2013.01)
*G10L 15/22* (2006.01)

(52) U.S. Cl.
CPC .............. *G10L 15/32* (2013.01); *G10L 15/04* (2013.01); *G10L 15/22* (2013.01); *G10L 15/26* (2013.01); *G10L 15/30* (2013.01)

(58) Field of Classification Search
CPC ................................. G10L 15/22; G10L 15/26
See application file for complete search history.

(56) References Cited

U.S. PATENT DOCUMENTS

| | | | |
|---|---|---|---|
| 5,897,616 A * | 4/1999 | Kanevsky | G10L 17/22 704/270.1 |
| 6,480,825 B1 | 11/2002 | Sharma et al. | |
| 8,214,208 B2 | 7/2012 | Mallett et al. | |
| 8,249,868 B2 | 8/2012 | Lloyd et al. | |
| 8,831,185 B2 | 9/2014 | Gandhi et al. | |
| 10,511,592 B1 | 12/2019 | Phruksawan et al. | |
| 10,726,831 B2 | 7/2020 | Di Fabbrizio et al. | |
| 2009/0043583 A1 | 2/2009 | Agapi et al. | |
| 2011/0295603 A1 | 12/2011 | Meisel | |
| 2013/0132092 A1 | 5/2013 | Cabezas et al. | |
| 2014/0088961 A1 | 3/2014 | Woodward et al. | |
| 2015/0302852 A1* | 10/2015 | Lu | G10L 15/30 704/246 |
| 2016/0269524 A1 | 9/2016 | Stottlemyer | |
| 2018/0061421 A1* | 3/2018 | Sarikaya | G10L 15/183 |
| 2018/0151182 A1 | 5/2018 | Wyss et al. | |
| 2019/0272824 A1 | 9/2019 | Scheiner et al. | |

* cited by examiner

*Primary Examiner* — Ibrahim Siddo
(74) *Attorney, Agent, or Firm* — Gavin Giraud

(57) ABSTRACT

In a method for improving speech analysis between devices, a processor receives a speech input comprising audio from a speech recognition platform. A processor segments the speech input into input vectors. A processor maps the input vectors to a profile. A processor calculates affinity coefficients between each input vector and the profile. A processor aggregates the input vectors and affinity coefficients in a user profile. A processor implements the user profile in a speech recognition program.

20 Claims, 4 Drawing Sheets

PROFILES FOR ENHANCED SPEECH RECOGNITION TRAINING

BACKGROUND

The present invention relates generally to the field of speech recognition, and more particularly to calculating coefficients for categorizing a user's speech pattern.

Speech recognition is an interdisciplinary subfield of computer science and computational linguistics that develops methodologies and technologies that enable the recognition and translation of spoken language into text by computers. It is also known as automatic speech recognition, computer speech recognition or speech to text.

Speech recognition is integrated into the daily routines of millions of users via home assistants, smart televisions and appliances, and automobile dashboards, among other things. Although the technology has improved significantly, speech recognition still requires user training to be most accurate. Some speech recognition systems require training, wherein a system analyzes the person's specific voice and uses it to fine-tune the recognition of that person's speech, resulting in increased accuracy.

Speech recognition applications include voice user interfaces such as voice dialing (e.g. "call home"), call routing (e.g. "I would like to make a collect call"), domotic appliance control, search key words (e.g. find a podcast where particular words were spoken), simple data entry (e.g., entering a credit card number), preparation of structured documents (e.g. a radiology report), determining speaker characteristics, speech-to-text processing (e.g., word processors or emails), and aircraft (usually termed direct voice input).

SUMMARY

Aspects of an embodiment of the present invention disclose a method, computer program product, and computing system for improving speech analysis between devices. A processor receives a speech input comprising audio from a speech recognition platform. A processor segments the speech input into input vectors. A processor maps the input vectors to a profile segment. A processor calculates affinity coefficients between each input vector and the profile. A processor aggregates the input vectors and affinity coefficients in a user profile. A processor implements the user profile in a speech recognition program.

DETAILED DESCRIPTION

While speech recognition models have increased in complexity and accuracy, embodiments of the present invention recognize that there is still demand for increasing the adaptability of speech recognition to individuals. Even among populations that speak the same language there is variety in how individuals pronounce words and phrases. This variety in sounds means that some individuals will speak outside of the patterns that are recognized by speech recognition models. Speech recognition models have been improved to recognize a wide variety of styles, accents, and word selections, but to really adapt to a specific individual user, the user is sometimes required to train each speech recognition system individually. To enable disparate systems to collectively learn from and adapt to a single user, the embodiments disclosed herein include input vectors that utilize affinity coefficients to implement user profiles in a speech recognition program. The user profiles improve accuracy of the speech recognition program, which lowers the computational requirements for the computer components working to determine commands/requests spoken to the speech recognition program.

Figure 1:
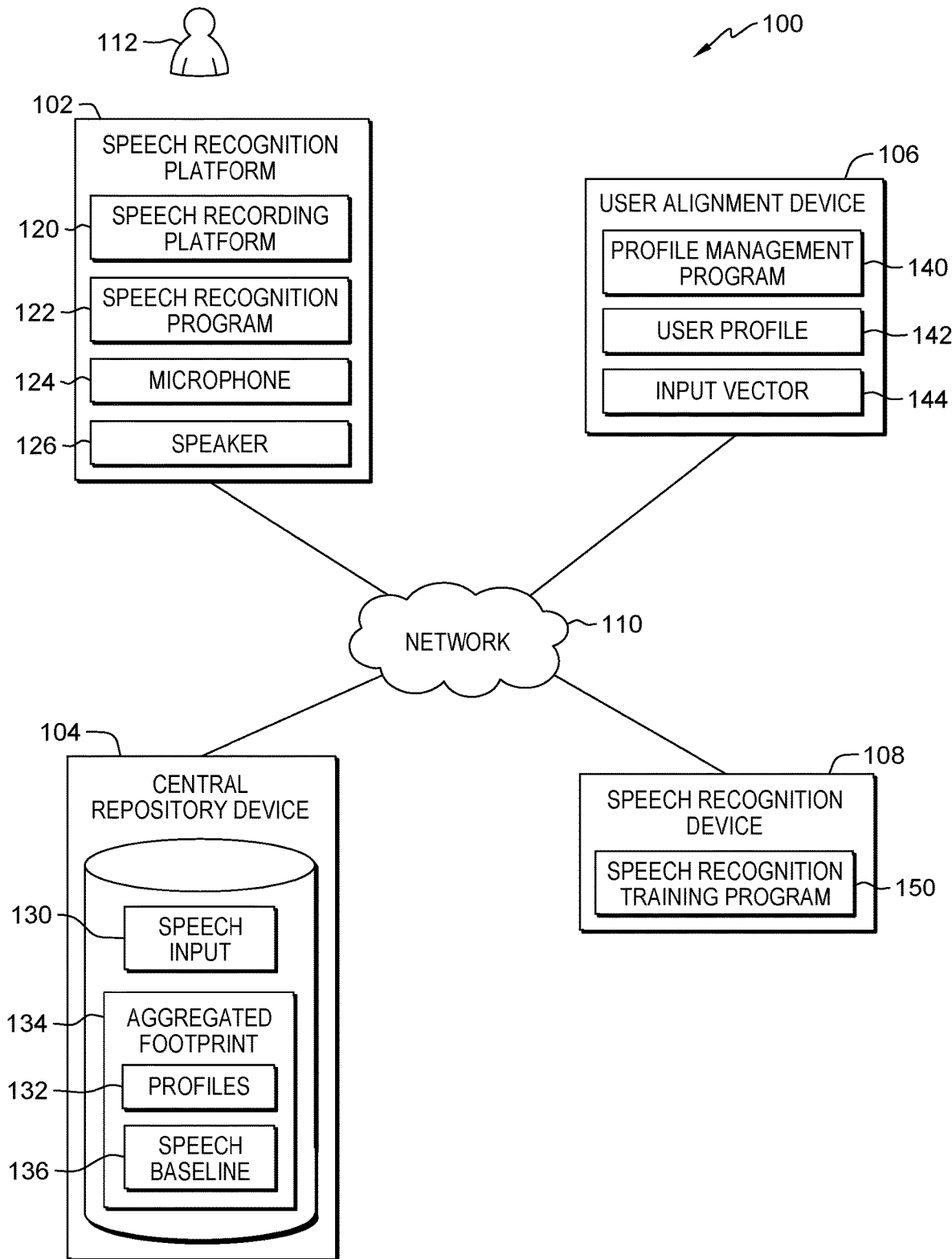
FIG. 1 is a functional block diagram illustrating a speech recognition environment, in accordance with an embodiment of the present invention.

Turning now to the drawings, FIG. 1 depicts a functional block diagram illustrating a speech recognition environment 100, in accordance with one embodiment of the present invention. FIG. 1 provides only an illustration of one implementation and does not imply any limitations regarding the environments in which different embodiments may be implemented. Many modifications to the depicted environment may be made by those skilled in the art without departing from the scope of the invention as recited by the claims.

The speech recognition environment 100 includes a speech recognition platform 102, a central repository device 104, a first speech recognition training device 106, and a second speech recognition training device 108 connected over a network 110. The network 110 can be, for example, a telecommunications network, a local area network (LAN), a wide area network (WAN), such as the Internet, or a combination of the three, and can include wired, wireless, or fiber optic connections. The network 110 can include one or more wired and/or wireless networks that are capable of receiving and transmitting data, voice, and/or video signals, including multimedia signals that include voice, data, and video information. In general, the network 110 can be any combination of connections and protocols that will support communications between the speech recognition platform 102, the central repository device 104, the first speech recognition training device 106, and the second speech recognition training device 108 and other computing devices (not shown) within the pipeline ranking environment 100. In various embodiments, the network 110 operates locally via wired, wireless, or optical connections and can be any combination of connections and protocols (e.g., personal area network (PAN), near field communication (NFC), laser, infrared, ultrasonic, etc.).

The central repository device 104 can be a standalone computing device, a management server, a web server, a mobile computing device, or any other electronic device or computing system capable of receiving, sending, and processing data. In other embodiments, the central repository device 104 can represent a server computing system utilizing multiple computers as a server system, such as in a cloud computing environment. In another embodiment, the central repository device 104 can be a laptop computer, a tablet computer, a netbook computer, a personal computer (PC), a desktop computer, a personal digital assistant (PDA), a smart phone, or any programmable electronic device capable of communicating with other computing devices (not shown) within the speech recognition environment 100 via the network 110. In another embodiment, the central repository device 104 represents a computing system utilizing clustered computers and components (e.g., database server computers, application server computers, etc.) that act as a single pool of seamless resources when accessed within the speech recognition environment 100. In the depicted embodiment, the central repository device 104 may contain applications, databases, programs, etc. which have not been depicted in the speech recognition environment 100. The central repository device 104 may include internal and external hardware components with any type of storage device capable of storing data and configuration files that can be accessed and utilized by the speech recognition platform 102, the first speech recognition training device 106, and the second speech recognition training device 108, such as a database server, a hard disk drive, or a flash memory.

The central repository device 104 stores data used by any of the devices/programs within the speech recognition environment 100. In FIG. 1, the central repository device 104 is depicted as a separate device, but in other embodiments, the central repository device 104 may reside elsewhere within the speech recognition environment 100 provided that the speech recognition platform 102 and the first speech recognition training device 106, and the second speech recognition training device 108 have access to the stored data. Specifically, the speech recognition platform 102, the central repository device 104, and the first speech recognition training device 106, may be implemented in a single device, such as a vehicle, a home assistant, a smart appliance, or other voice-responsive device. Likewise, the speech recognition platform 102, the central repository device 104, and the second speech recognition training device 108, may also be implemented in a single device.

The speech recognition environment 100 develops and implements programs to improve understanding of communication from a user 112. For example, the speech recognition environment 100 allows the user 112 to communicate in the language and with the personal speech pattern that the user 112 uses during normal speech. The speech recognition platform 102 is a device or collection of devices that directly interacts with the user 112 using a speech recording program 120, a speech recognition program 122, and a microphone 124. The speech recognition platform 102 may also include a speaker 126 to convey information back to the user 112. To increase accuracy at which the speech recognition program 122 understands the user 112, the speech recognition program 122 may be enhanced by a profile management program 140 embodied on the second speech recognition training device 108. The profile management program 140 aligns a user profile 142 with stored profiles 132 so that previously completed training may be used to interpret speech from the user 112, as described in detail below. The profile management program 140 uses input vectors 144 to segment speech input 130 so that aligning the user profile 142 and the stored profile 132 is accomplished based on granular speech patterns.

In a trained speech recognition environment 100, the central repository device 104 stores many profiles 132. The profiles 132 include dynamic categories that have a derived coefficient (e.g., a score between 0 and 1) that represents the presence or absence of a speech pattern. Conceptually, the coefficients include differentiation for users 112 that speak with different speech patterns such as frequency, tone, sounds of letter combinations, and syllable length. For example, a coefficient could represent the presence of non-rhotic "r" in certain words, presence of vocal fry, or the use of colloquialisms. In practice, however, the coefficients may be mapped by machine learning algorithms that assign coefficients based on segmentation that is not perceptible to a human observer. For example, two users 112 speaking with the same accent may generate profiles 132 that do not have any of the coefficients that are the same.

The profiles 132 may also conceptually represent multiple speech patterns for a single user 112. For example, a user 112 may speak with one speech pattern at one part of the day (e.g., slower speech pattern), while speaking with a different speech pattern after consuming caffeine (e.g., faster speech pattern). The central repository device 104 may include stored profiles 132 for both of these speech patterns. Furthermore, since the coefficients may be calculated using machine learning, the profiles 132 for a slower speech pattern and a faster speech pattern from the same user 112 may have coefficients that a human observer would not identify as being related.

Figure 2:
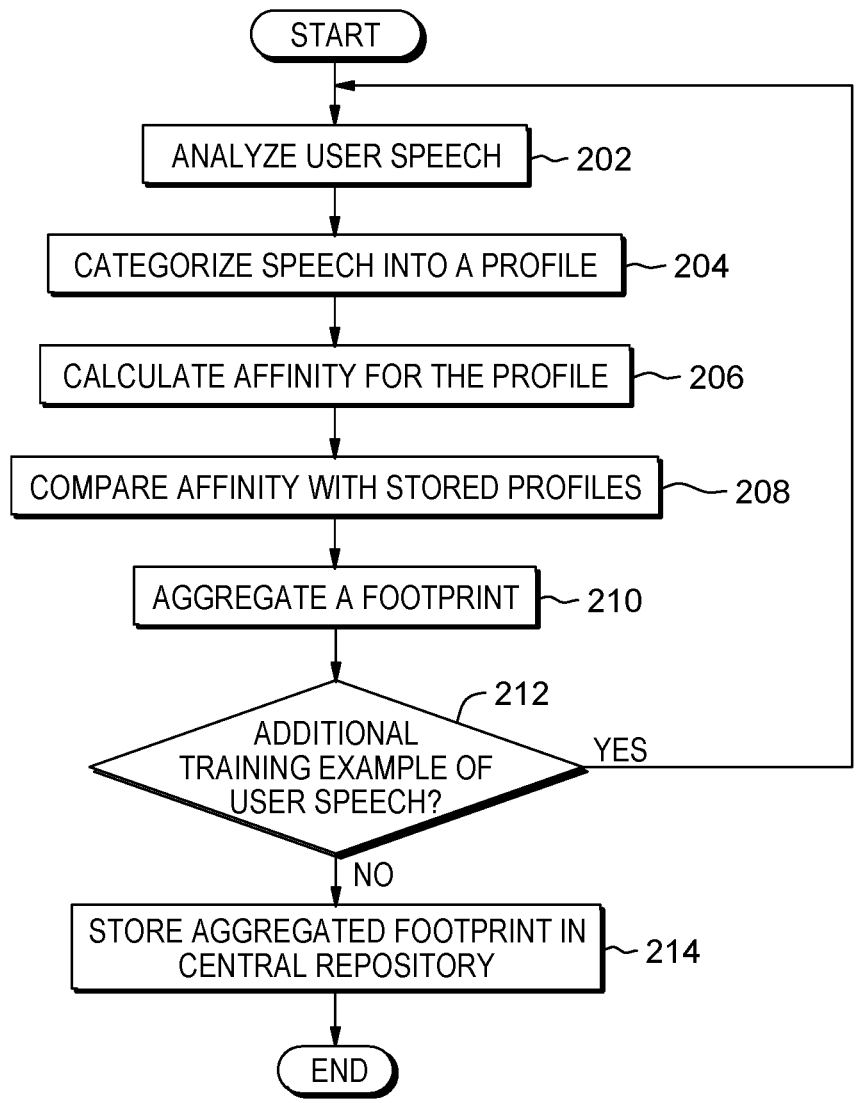
FIG. 2 is a flowchart depicting operational steps of a speech recognition training program, in accordance with an embodiment of the present invention.

FIG. 2 is a flowchart depicting operational steps of a speech recognition training program 150 compiling profiles 132 without referencing previous, in accordance with an embodiment of the present invention. The speech recognition training program 150 analyzes a speech input from the user 112 (block 202). The speech input may be delivered from the speech recognition platform 102, or may be previously recorded for training purposes and conveyed to the speech recognition training program 150 directly from the central repository device 104. The speech analysis performed by speech recognition training program 150 may include functions such as user 112 identification. In certain embodiments, the speech analysis may include text recognition and request response. The speech analysis in a first iteration of the process does not include any matching to a profile 132. In certain embodiments, analyzing user speech may include audio with accompanying intended text.

The speech recognition training program 150 categorizes the speech input 130 into a profile 132 (block 204). The speech input 130 is segmented (e.g., words, letters, combinations of letters, or other machine-designated segments) so that granular parts of the speech input 130 are categorized by assigning a coefficient. As mentioned above, the profiles 132 may categorize the speech based on frequency, tone, sounds of letter combinations, and syllable length. In a first iteration of the method, the speech input 130 may not provide many categories for segmentation, but the speech recognition training program 150 may iterate many times to expand the number of categories into which the profile 132 is segmented. The speech recognition training program 150 also calculates an affinity coefficient for each category in the profile 132 (block 206). The affinity coefficient is the level of matching (i.e., affinity) between the segmented category from block 204 and a stored category. Conceptually this could be thought of as a match between a non-rhotic "r" in the speech input 130, and a previously recorded segment designated as a non-rhotic "r". In a first iteration of the method, the speech input 130 may include affinity coefficients that are very high, as the speech input 130 is matching affinity coefficients only to itself. The speech recognition training program 150 also aggregates a footprint of all the segmented categories (block 210). The aggregated footprint represents the total combination of each category and the average coefficient for each segmented coefficient. The aggregated footprint may expand over time as more examples are received by the speech recognition training program 150.

The speech recognition training program 150 may repeat the process of FIG. 2 hundreds or thousands of times. That is, if the speech recognition training program 150 receives additional training examples of user speech (block 212 "Yes"), then the speech recognition training program 150 repeats the process beginning at analyzing user speech (block 202, repeat). In repetitions of the process, the speech recognition training program 150 may combine, split, or shift the coefficients in each of the profiles 132. That is, if several examples of speech inputs 130 contain coefficient values that are similar to two different profiles 132, the two profiles may be combined and averaged with the coefficients indicated by the new speech inputs 130. Conversely, if new speech inputs 130 indicate a grouping that was not apparent before, the profile 132 may split into two profiles 132. The groupings may be determined, for example, using K-means clustering algorithms. The aggregated footprint 134 thus includes the profiles 132 and a speech baseline 136. The speech baseline 136 is the profile having the default value for all of the coefficients that the speech recognition training program 150 is enabled to have. The default value for each coefficient may be user defined, or may include a weighted average across the affinity coefficients along a normal distribution for all inputs used during training by the speech recognition training program 150. The number of coefficients may change between embodiments of the invention, but may range up to several thousand different coefficients. The speech recognition training program 150 may define the individual profiles 132 by the difference of each coefficient from the speech baseline 136.

If the speech recognition training program 150 does not receive additional training examples of user speech (block 212 "No"), then the speech recognition training program 150 stores the aggregated footprint in the central repository device 104 (block 214). Once the speech recognition training program 150 determines and stores the aggregated footprint 134 in the central repository device 104, the profile management program 140 may be used to categorize and establish user profiles 142 for implementation into the speech recognition program 122 based on new speech inputs 130.

Figure 3:
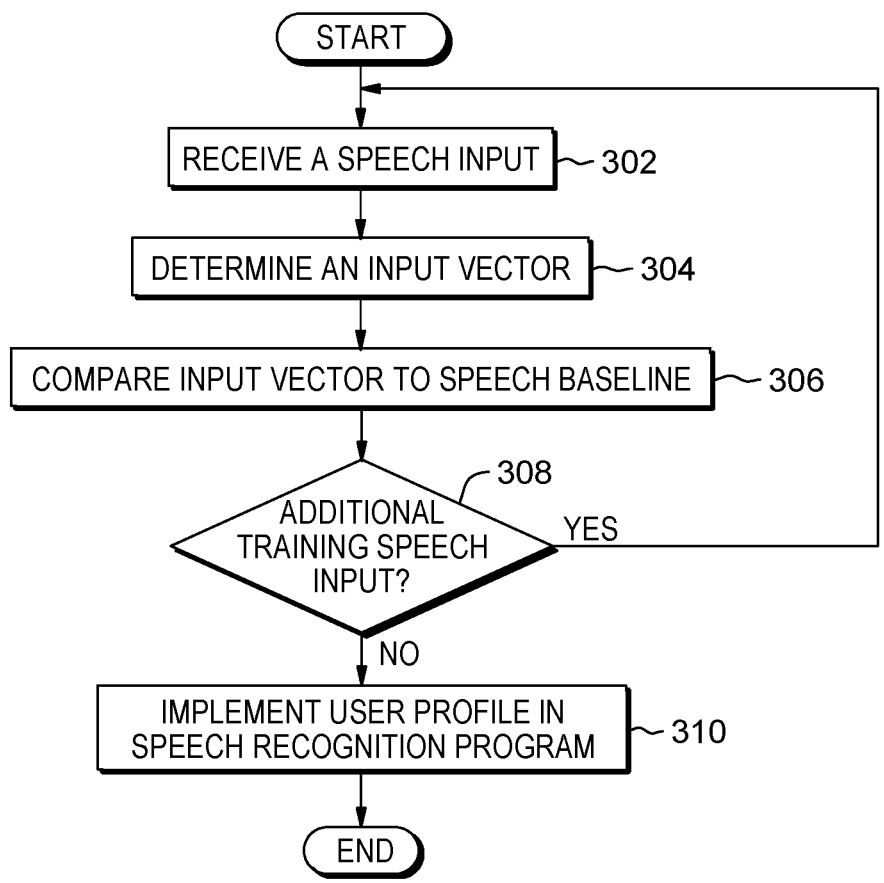
FIG. 3 is a flowchart depicting operational steps of a profile alignment program, in accordance with an embodiment of the present invention.

FIG. 3 is a flowchart depicting operational steps of the profile management program 140 on the second speech recognition training device 108, in accordance with an embodiment of the present invention. The profile management program 140 receives a speech input 130 (block 302). For example, the speech recording program 120 may monitor the microphone 124 and begin recording when the user 112 gives an initiation signal, such as a verbal initiation command, button push, or remote activation. The speech recording program 120 then records the user 112 with the microphone 124 and copies the audio into a speech input 130. The speech input 130 may also include text translated by the speech recognition program 122. The initial text that is included in the speech input 130 is not translated using a user profile 142, but the speech recognition program 122 may include a default text translation based on a more universal speech recognition detection algorithm. The speech recording program 120 may record the speech input 130 with instructions to the user 112 to pronounce an intended text, wherein the user 112 repeats or reads a specific phrase meant to assist the profile management program 140 in determining a user profile 142.

The profile management program 140 also segments the speech input into an input vector 144 (block 304). The input vector 144 includes input coefficients based on the speech input 130. Input coefficients may include, for example, vectorization of the speech input 130. In such embodiments, the coefficients serve as a sort of Dewey Decimal System for speech profiles 132. In contrast to the training of FIG. 2, however, the profile management program 140 also maps the input vector 144 to the profiles 132 stored on the central repository device 104 (block 306). As described above, the speech baseline 136 may be part of the aggregated footprint 134 trained by the speech recognition training program 150. The speech baseline 136 includes affinity coefficients that correspond to the coefficients of the input vector 144. In certain embodiments, the number of input coefficients in the input vector 144 is less than the number of affinity coefficients in the speech baseline 136. Comparing the input vector 144 to the speech baseline 136 thus produces differences in the coefficients, which are aggregated to define a user profile 142 (block 308). The differences in the coefficients may be calculated on a word-by-word basis, or by calculating the coefficients and differences for the phrase included in the speech input 130. The user profile 142 may be matched to a previously defined and implemented profile 132 that is stored in the aggregated footprint 134. In certain embodiments, the user profile 142 may be defined only as a difference from the speech baseline 136, such that a match to the defined profiles 132 is not necessary. These embodiments may be useful, for example, when storage memory is limited on the first speech recognition training device 106, and the first speech recognition training device 106 and/or the speech recognition platform 102 do not have access to the central repository device 104 where the profiles 132 are stored.

If the profile management program 140 receives additional training speech inputs 130 (block 310 "Yes"), then the profile management program 140 repeats the process from receiving the speech input 130 to update the aggregated user profile (block 302). In this way, the user profile 142 may be improved and tuned specifically to the user 112. The user profile 142 may also be improved and tuned over multiple speech recognition platforms 102. Specifically, the user 112 may speak one speech input 130 that is received at a first user device, and may speak a second speech input that is received from a second user device (e.g., a second speech recognition platform 102). Additionally or alternatively, the user profile 142 may be matched independently of previous matches to profiles 132. That is, the profile management program 140 is able to determine different user profiles 142 based on changes in the way the same user 112 speaks. For example, the user 112 may speak more slowly at certain times of day, or the user 112 may speak faster or louder depending on their mood (e.g., when the user 112 is angry or feeling urgency). Furthermore, a multi-lingual speaker may use different accents or speech patterns depending on who is surrounding the user 112. The profile management program 140 may thus match the user profile 142 to a profile 132 matching the current speech input 130 regardless of profiles 132 that were matched to the user 112 previously.

If the profile management program 140 receives no additional training speech inputs 130 (block 310 "No"), then the profile management program 140 implements the user profile 142 in the speech recognition program 122 (block 312). The speech recognition program 122 is thus able to respond more accurately to speech from the user 112, and answer questions, start timers, and record commands in a manner more in line with the user's 112 actual desires.

Figure 4:
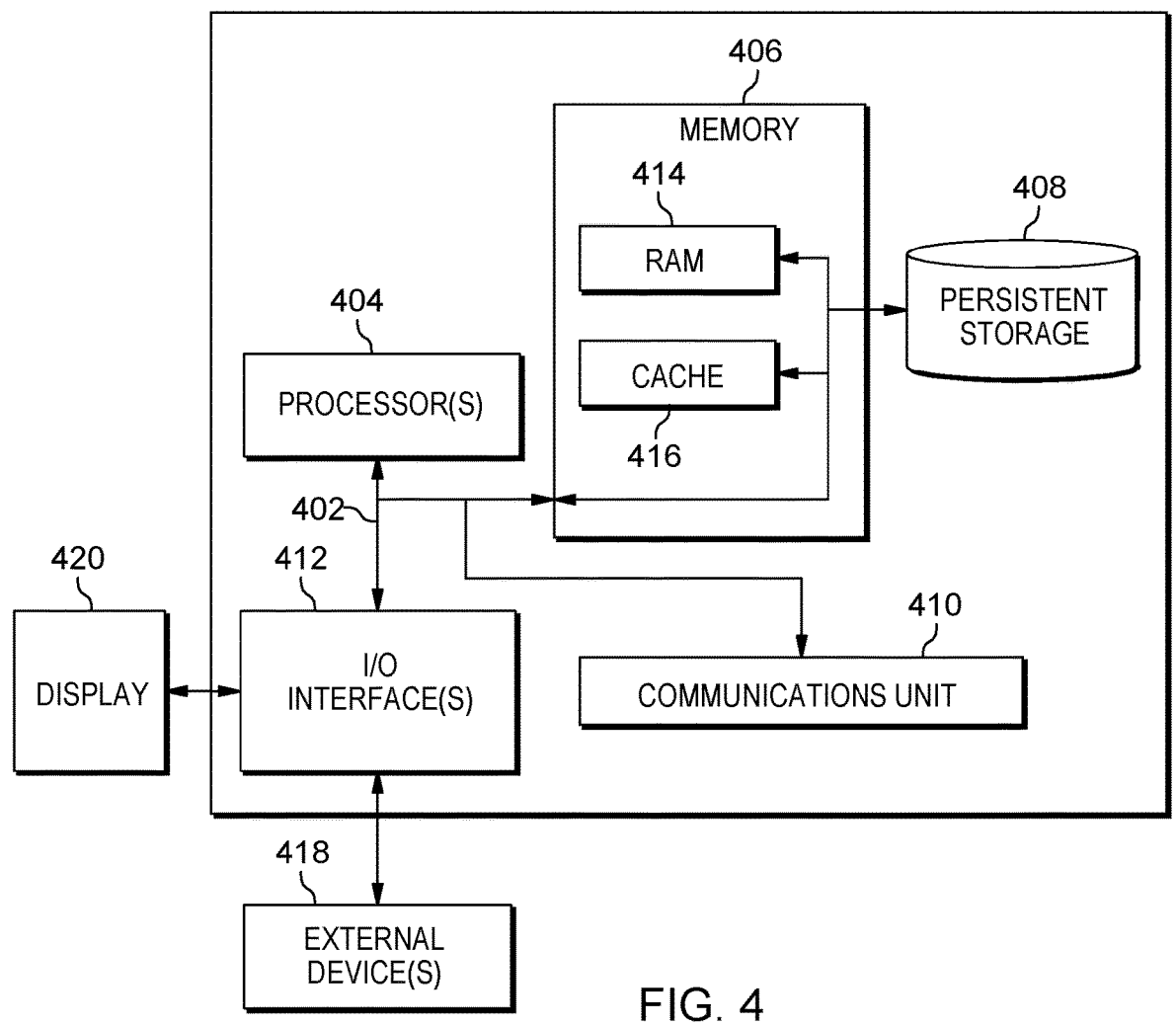
FIG. 4 is a block diagram of the computer components of the speech recognition environment, in accordance with an embodiment of the present invention.

FIG. 4 depicts a block diagram of the computer components of the speech recognition environment in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

The speech recognition platform 102, the central repository device 104, the first speech recognition device 106, and the second speech recognition training device 108 may collectively or individually include communications fabric 402, which provides communications between RAM 414, cache 416, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses or a crossbar switch.

Memory 406 and persistent storage 408 are computer readable storage media. In this embodiment, memory 406 includes random access memory (RAM). In general, memory 406 can include any suitable volatile or non-volatile computer readable storage media. Cache 416 is a fast memory that enhances the performance of computer processor(s) 404 by holding recently accessed data, and data near accessed data, from memory 406.

The speech recording program, speech recognition program, profile alignment program, and speech recognition training program may be stored in persistent storage 408 and in memory 406 for execution and/or access by one or more of the respective computer processors 404 via cache 416. In an embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices. In these examples, communications unit 410 includes one or more network interface cards. Communications unit 410 may provide communications through the use of either or both physical and wireless communications links. The speech recording program, speech recognition program, profile alignment program, speech recognition training program, and other programs or files may be downloaded to persistent storage 408 through communications unit 410.

I/O interface(s) 412 allows for input and output of data with other devices that may be connected to speech recognition environment 100. For example, I/O interface 412 may provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data used to practice embodiments of the present invention (e.g., speech recording program, speech recognition program, profile alignment program, and speech recognition training program) can be stored on such portable computer readable storage media and can be loaded onto persistent storage 408 via I/O interface(s) 412. I/O interface(s) 412 also connect to a display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for improving speech analysis between speech recognition platforms, comprising:
   receiving, by one or more processors, a speech input comprising audio from a speech recognition platform;
   segmenting the speech input into input vectors;
   mapping the input vectors to a profile;
   calculating affinity coefficients between each input vector and the profile;
   aggregating the input vectors and affinity coefficients in a user profile; and
   implementing the user profile in a speech recognition program.

2. The method of claim 1, wherein the speech input comprises text translated by the speech recognition platform.

3. The method of claim 1, wherein the speech input comprises an intended text.

4. The method of claim 1, wherein the input vectors comprise characteristics selected from the group consisting of: frequency, tone, sounds of letter combinations, and syllable length.

5. The method of claim 1, comprising:
   receiving a second speech input;
   segmenting the second speech input into additional input vectors; and
   calculating additional affinity coefficients for each additional input vector to update the user profile.

6. The method of claim 5, wherein the speech input is received from a first device, and the second speech input is received from a second device.

7. The method of claim 1, wherein a number of input coefficients is less than a number of affinity coefficients.

8. The method of claim 1, wherein the profile comprises a weighted average across the affinity coefficients along a normal distribution.

9. The method of claim 1, wherein the speech baseline is downloaded to the speech recognition platform, and comparing the input vector to the speech baseline and implementing the user profile is completed without the speech recognition platform using a network connection.

10. A computer program product for improving speech analysis between devices, comprising:

one or more computer readable storage media, and program instructions collectively stored on the one or more computer readable storage media, the program instructions comprising:

program instructions to receive, by one or more processors, a speech input comprising audio from a speech recognition platform;

program instructions to segment the speech input into input vectors;

program instructions to map the input vectors to a profile;

program instructions to calculate affinity coefficients between each input vector and the profile;

program instructions to aggregate the input vectors and affinity coefficients in a user profile; and implementing the user profile in a speech recognition program.

11. The computer program product of claim 10, wherein the speech input comprises text translated by the speech recognition platform.

12. The computer program product of claim 10, wherein the speech input comprises an intended text.

13. The computer program product of claim 10, wherein the input vectors comprise characteristics selected from the group consisting of: frequency, tone, sounds of letter combinations, and syllable length.

14. The computer program product of claim 10, comprising:

program instructions to receive a second speech input;

program instructions to segment the second speech input into additional input vectors; and program instructions to calculate additional affinity coefficients for each additional input vector to update the user profile.

15. The computer program product of claim 14, wherein the speech input is received from a first device, and the second speech input is received from a second device.

16. The computer program product of claim 10, wherein a number of input coefficients is less than a number of affinity coefficients.

17. The computer program product of claim 10, wherein the profile comprises a weighted average across the affinity coefficients along a normal distribution.

18. A computer system for improving speech analysis between devices, comprising:

one or more computer processors, one or more computer readable storage media, and program instructions collectively stored on the one or more computer readable storage media for execution by at least one of the one or more computer processors, the program instructions comprising:

program instructions to receive, by one or more processors, a speech input comprising audio from a speech recognition platform;

program instructions to segment the speech input into input vectors;

program instructions to map the input vectors to a profile;

program instructions to calculate affinity coefficients between each input vector and the profile;

program instructions to aggregate the input vectors and affinity coefficients in a user profile; and implementing the user profile in a speech recognition program.

19. The system of claim 18, comprising:

program instructions to receive a second speech input;

program instructions to segment the second speech input into additional input vectors; and program instructions to calculate additional affinity coefficients for each additional input vector to update the user profile.

20. The system of claim 19, wherein the speech input is received from a first device, and the second speech input is received from a second device.

* * * * *